Nov. 3, 1925.
1,560,153
F. J. ENGEL
HEADLIGHT FOR AUTOMOBILES
Filed Aug. 24, 1922
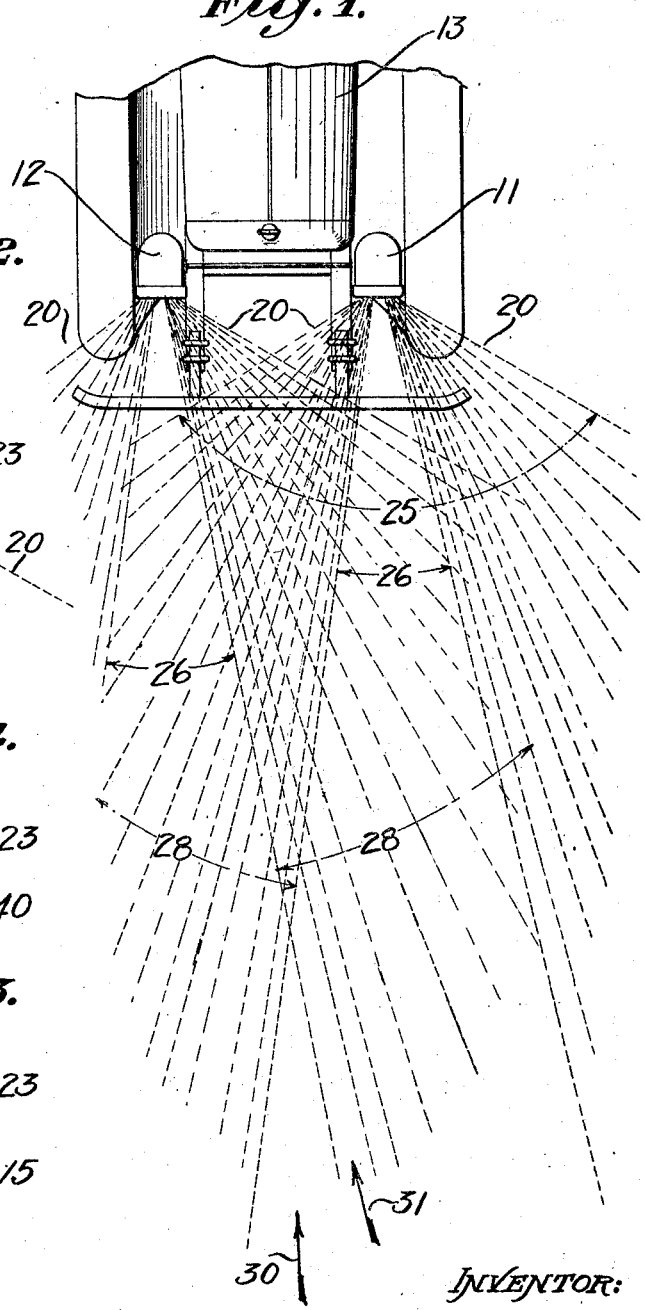
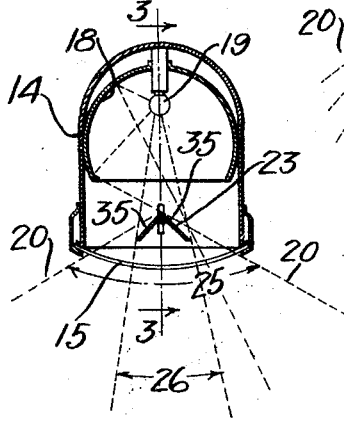
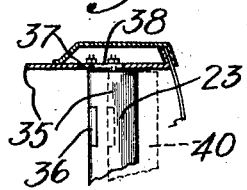
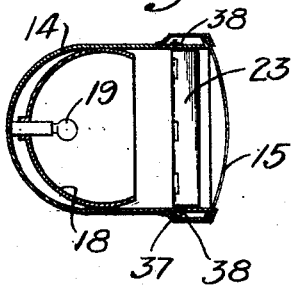
INVENTOR:
FREDERICK J. ENGEL,
BY
Graham + Lewis
ATTORNEYS.

Patented Nov. 3, 1925.

1,560,153

UNITED STATES PATENT OFFICE.

FREDERICK J. ENGEL, OF ANAHEIM, CALIFORNIA.

HEADLIGHT FOR AUTOMOBILES.

Application filed August 24, 1922. Serial No. 584,004.

*To all whom it may concern:*

Be it known that I, FREDERICK J. ENGEL, a citizen of the German Republic, residing at Anaheim, in the county of Orange and State of California, have invented a new and useful Improvement in Headlights for Automobiles, of which the following is a specification.

My invention relates to headlights and is particulary a device for use upon automobiles.

Various devices are now being employed in the endeavor to eliminate headlight glare and the misdirection of the beam cast by automobile headlights into the eyes of the drivers of vehicles coming towards the automobile. The expedient of directing the headlights downward, so that the beams thereof strike the road at a designated point ahead, is satisfactorily empoyed in travel upon level roads; but where an uneven contour is encountered, the light beam is at times directed upwardly directly into the eyes of drivers of oncoming machines, and does not perfectly light the roadway owing to its wavering tendency caused by the unevenness of the road being traveled. This same disadvantage is evident in the use of shields covering the upper portion of headlight lenses with a view towards cutting off the rays above a certain level.

It is an object of the invention to provide an arrangement of headlights upon a vehicle from which no light rays are cast in a directly forward direction which would blind the vision of drivers coming in the opposite direction. With this arrangement, the roadway is lighted by overlapping diagonally directed light rays in such a manner that the diagonally cast rays from one headlight illuminates the central area left dark by the absence of the forwardly directed rays.

It is also an object of the invention to provide an improved form of headlight which contributes to the method which I have devised.

The specific advantages of my invention and further objects thereof will be made exident hereinafter.

Referring to the drawing which is for illustrative purposes only,

Fig. 1 is a fragmentary plan view of the forward end of an automobile equipped with a lighting arrangement of my invention, this view being provided for the purpose of illustrating the feature of overlappping light beams, I employ.

Fig. 2 is a horizontal section through one of the headlights shown in Fig. 1.

Fig. 3 is a section through the headlight taken on a plane represented by the line 3—3 of Fig. 2.

Fig. 4 is a fragmentary vertical section illustrating the adjustability of the peculiar type of deflector I employ.

As shown in the drawing I employ a pair of headlights 11 and 12 which are mounted in customary manner upon an automobile 13. These headlights as shown in Fig. 2 are provided with a case 14 having a forward open end over which a lens 15 is maintained. Within the case 14 a reflector 18 is mounted, having the particular shape shown, so that the light rays delivered by the light globe 19 will be delivered through the lens 15 in fan shaped or sector formation as indicated by the dotted lines 20.

At the forward end of the case 14 a vertical deflector member 23 is mounted. This deflector member obscures a rectangular area vertically and centrally within the light beam cast by the reflector, and being so disposed, the passage of light rays from the headlight in a directly forward direction is prevented by the deflector; and also those rays which would be projected at a slight angle to the directly forward direction are obstructed thereby. Thus, it will be perceived that from a large sector of light as indicated at 25 a narrow sector 26 is removed so that a person positioned directly in front of the headlight would not receive any direct light rays therefrom. By placing the headlights 11 and 12 adjacently, the direct sectors 26 are illuminated by the inner wings 28 of the broad sectors 25.

By this arrangement, the entire roadway before an automobile is illuminated without light rays being cast directly down the road which would interfere with the vision of the drivers of oncoming machines. Thus it is evident that a person looking towards the automobile 12 as indicated by the arrow 30 would not be subjected to the brilliant rays which are ordinarily cast by automobile headlights, but would be able to proceed forwardly towards the car until the angle of vision assumes that indicated by the arrow 31 without receiving any direct rays from either of the headlights 11 or 12 but no matter from what point a person might approach the automobile and come directly into any of the rays of light of said headlights, said rays will immediately pass such person owing to the travel of the automobile and to the angularity of the light rays to the line of travel of the automobile, and said headlights will project their succeeding rays of light on such person at varying angles, whereby the blinding effect of the light rays upon such person will be eliminated and his further progress made safe.

The width of the obscured sector 26 may be changed to suit the spacing of the headlights 11 and 12 by spreading the wings 35 of the member 23, which wings are hinged at 36 upon a vertical rod 37 which extends through slots 38 disposed in the forward end of the case 14 in a vertical plane, so that a forward and rearward adjustment of the member 23 may be provided as indicated by the dotted lines 40 of Fig. 4.

With reference to Fig. 2, it is evident that by moving the member 23 rearwardly in the slots 38, it is possible to control the width of the large sector 25 cast by the headlight and that by bringing the forward ends of the wings 35 closer together, the direct sector 26 may be narrowed down, if desired. It will be understood from Fig. 2 that those forwardly directed rays which are cut off by the member 23 are deflected by the wings 35 of the member 23 and pass outwardly through the lens 15 at each side.

My invention is evolved from the idea of lighting the roadway with diagonally disposed beams of light so that the disadvantage of the forwardly directed beams is overcome. The overlapping of the light beams cast by the headlights 11 and 12 as shown in Fig. 1 makes possible the lighting of the entire surface of the roadway before the machine, and the adjustability of the deflector member makes it possible to adjust the length of the lighted area as conditions may require, the horizontal length of each headlight being, as shown, substantially greater than its transverse diameter, so that the deflectors may be mounted at the rear of the lenses 15, to be protected thereby, and nevertheless serve to illuminate the road by beams projected diagonally forward.

I claim as my invention:

1. In a headlight of the class described, the combination of: a shell; a reflector situated in said shell; a substantially central obscuring deflector; means whereby the effective width of said deflector may be varied; and means for so supporting said deflector that it is adjustable between a rearward and a forward position.

2. In a headlight of the class described, the combination of: a shell provided with slots in substantially the same vertical plane; a reflector in said shell; a hinging rod extending through a pair of said slots in said shell, said rod being movable either away from or toward said reflector; and a pair of deflector wings situated on said rod.

3. In a headlight of the class described, the combination of: a shell provided with slots in substantially the same vertical plane; a reflector in said shell; a hinging rod extending through a pair of said slots in said shell, said rod being movable either away from or toward said reflector; and a pair of deflector wings situated on said rod, each of said wings being independently swingable on said rod.

In testimony whereof, I have hereunto set my hand at Los Angeles, in the county of Los Angeles, California, this 5th day of August, 1922.

FREDERICK J. ENGEL.